US012646208B2

(12) United States Patent
Zeng et al.

(10) Patent No.: US 12,646,208 B2
(45) Date of Patent: Jun. 2, 2026

(54) METHOD AND APPARATUS OF DETERMINING DISPENSING POSITION, DISPENSING SYSTEM FOR BATTERIES, ELECTRONIC DEVICE AND MEDIUM

(71) Applicant: CONTEMPORARY AMPEREX TECHNOLOGY (HONG KONG) LIMITED, Hong Kong (CN)

(72) Inventors: Weipu Zeng, Ningde (CN); Chunqin Shen, Ningde (CN); Lei Song, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 244 days.

(21) Appl. No.: 18/415,942

(22) Filed: Jan. 18, 2024

(65) Prior Publication Data

US 2025/0238952 A1     Jul. 24, 2025

Related U.S. Application Data

(63) Continuation of application No. PCT/CN2023/101907, filed on Jun. 21, 2023.

(51) Int. Cl.
| | |
|---|---|
| *G06T 7/136* | (2017.01) |
| *B25J 9/16* | (2006.01) |
| *G06T 7/13* | (2017.01) |
| *G06T 7/66* | (2017.01) |
(Continued)

(52) U.S. Cl.
CPC .............. *G06T 7/74* (2017.01); *B25J 9/1697* (2013.01); *G06T 7/13* (2017.01); *G06T 7/136*

(2017.01); *G06T 7/66* (2017.01); *H01M 10/0404* (2013.01); *G06T 2207/30152* (2013.01)

(58) Field of Classification Search
CPC .. G06T 7/74; G06T 7/136; G06T 7/13; G06T 7/66; G06T 2207/30152; B25J 9/1697; H01M 10/0404
See application file for complete search history.

(56) References Cited

U.S. PATENT DOCUMENTS

2018/0106716 A1     4/2018  Sasaki et al.

FOREIGN PATENT DOCUMENTS

| CN | 107358630 A | 11/2017 | |
|---|---|---|---|
| CN | 110248075 A | 9/2019 | |
| CN | 112894138 A * | 6/2021 | ........... B23K 26/044 |
(Continued)

OTHER PUBLICATIONS

Extended European search report for EP application No. 23832943.7 dated Aug. 8, 2024.
(Continued)

*Primary Examiner* — Sumati Lefkowitz
*Assistant Examiner* — Michael Adam Shariff
(74) *Attorney, Agent, or Firm* — Ladas & Parry LLP

(57) ABSTRACT

Embodiments of the present application provide a method and apparatus of determining a dispensing position, a dispensing system for batteries, an electronic device and a medium. The method of determining a dispensing position includes receiving an image of a battery module, processing the image to obtain a contour feature image of at least one object on the battery module, and determining, based on the contour feature image, a dispensing position of the at least one object.

12 Claims, 16 Drawing Sheets

(51) Int. Cl.
  *G06T 7/73* (2017.01)
  *H01M 10/04* (2006.01)

(56) References Cited

FOREIGN PATENT DOCUMENTS

| | | |
|---|---|---|
| CN | 113129334 A | 7/2021 |
| CN | 113284191 A | 8/2021 |
| CN | 114871073 A | 8/2022 |
| CN | 217931416 U | 11/2022 |
| CN | 115825070 A | 3/2023 |
| CN | 219273532 U | 6/2023 |
| WO | 2017128865 A1 | 8/2017 |

OTHER PUBLICATIONS

International Search Report for International Application PCT/CN2023/101907, dated Nov. 24, 2023.

* cited by examiner

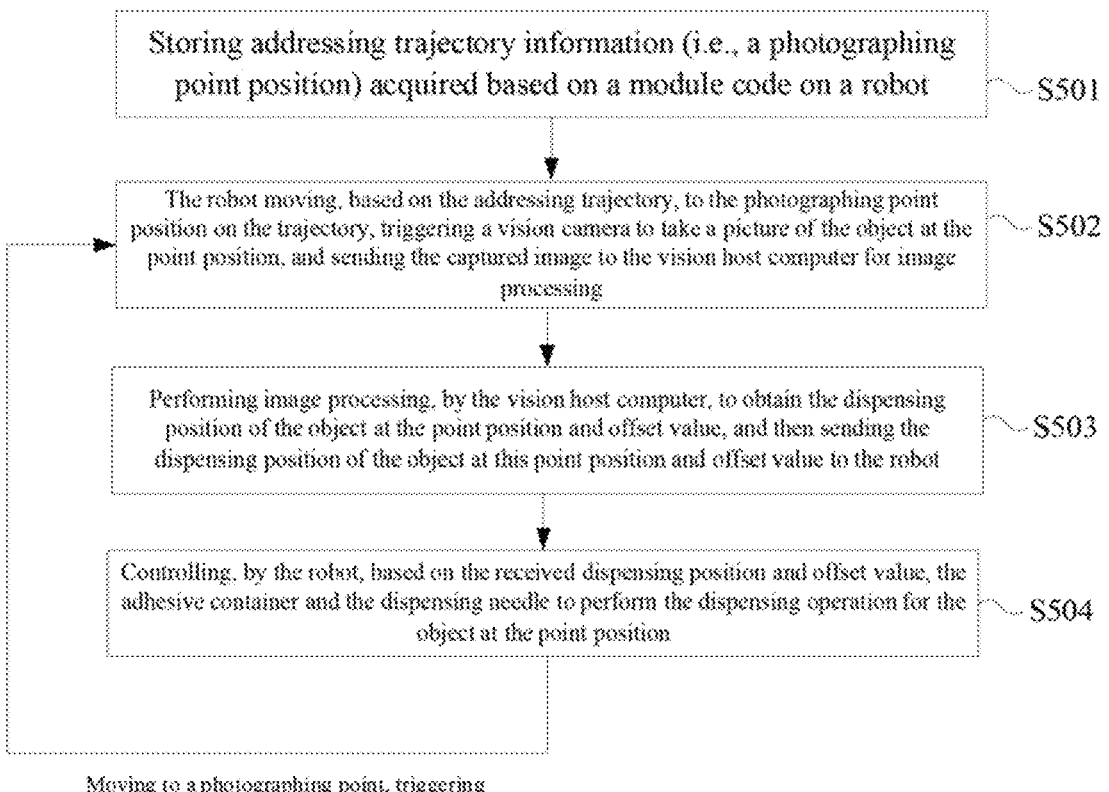

Storing addressing trajectory information (i.e., a photographing point position) acquired based on a module code on a robot ～S501

The robot moving, based on the addressing trajectory, to the photographing point position on the trajectory, triggering a vision camera to take a picture of the object at the point position, and sending the captured image to the vision host computer for image processing ～S502

Performing image processing, by the vision host computer, to obtain the dispensing position of the object at the point position and offset value, and then sending the dispensing position of the object at this point position and offset value to the robot ～S503

Controlling, by the robot, based on the received dispensing position and offset value, the adhesive container and the dispensing needle to perform the dispensing operation for the object at the point position ～S504

Moving to a photographing point, triggering photographing, image processing and dispensing until all point positions are dispensed with adhesive

FIG. 5

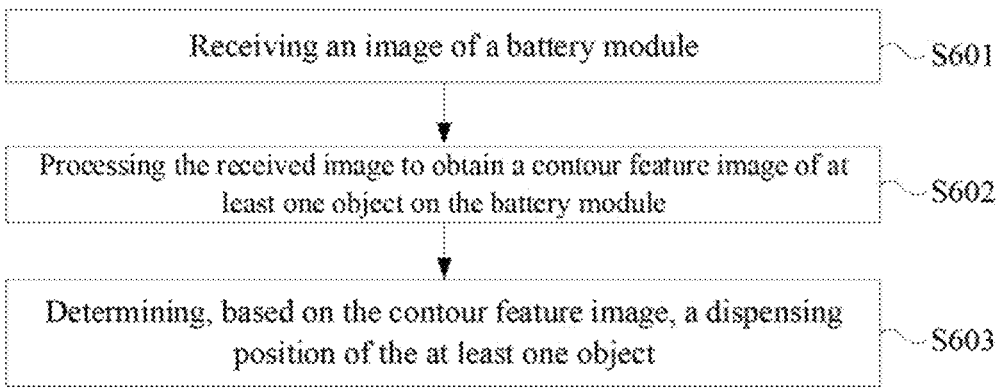

Receiving an image of a battery module ～S601

Processing the received image to obtain a contour feature image of at least one object on the battery module ～S602

Determining, based on the contour feature image, a dispensing position of the at least one object ～S603

FIG. 6

METHOD AND APPARATUS OF DETERMINING DISPENSING POSITION, DISPENSING SYSTEM FOR BATTERIES, ELECTRONIC DEVICE AND MEDIUM

CROSS REFERENCE TO RELATED APPLICATION

This application is a continuation of International Patent Application No. PCT/CN2023/101907, filed on Jun. 21, 2023, which is incorporated by reference in its entirety.

TECHNICAL FIELD

The present application relates to the field of image processing and automatic control, and in particular to a method and apparatus of determining a dispensing position, a dispensing system for batteries, an electronic device and a medium.

BACKGROUND

After a plurality of components are connected by welding, adhesive is dispensed to the connected components to secure solder joints and reduce the risk of disconnection of the connected components.

In the prior art, after the components are welded, manual dispensing operations are usually used, with high production cost and low production efficiency.

SUMMARY

The present application provides a method and apparatus of determining a dispensing position, a dispensing system for batteries, an electronic device and a medium.

In a first aspect, the present application provides a method of determining a dispensing position, which includes receiving an image of a battery module, processing the image to obtain a contour feature image of at least one object on the battery module, and determining, based on the contour feature image, a dispensing position of the at least one object.

In some embodiments, the method of determining a dispensing position further includes acquiring, based on a module code of the battery module, addressing trajectory information of the at least one object; and acquiring, based on the addressing trajectory information, a bonding aluminum wire image or a temperature sensing probe image.

In some embodiments, the method of determining a dispensing position further includes detecting endpoints of two aluminum wires parallel to each other on a contour feature image of the bonding aluminum wires and detecting an edge intersecting the two aluminum wires as a datum line; calculating the distance between the two aluminum wires parallel to each other; and determining a dispensing position of the bonding aluminum wires based on the midpoint of a straight line used to calculate the distance between the two aluminum wires, the datum line, and a connecting line between the endpoints of the two aluminum wires.

In some embodiments, the method of determining a dispensing position further includes binarizing the bonding aluminum wire image to obtain a binarized image of the bonding aluminum wire image; and detecting an outer contour feature of the aluminum wires on the binarized image.

In some embodiments, the method of determining a dispensing position further includes: when a matching degree between the detected outer contour feature and a palladium sheet contour feature template is greater than or equal to a first predetermined threshold, using the detected outer contour feature as a contour feature image of a palladium sheet.

In some embodiments, the method of determining a dispensing position further includes: when a matching degree between the detected outer contour feature and a nickel pad contour feature template is greater than or equal to a second predetermined threshold, using the detected outer contour feature as a contour feature image of a nickel pad.

In some embodiments, the method of determining the dispensing position further includes enhancing grayscale of the bonding aluminum wire image to obtain a grayscale-enhanced image of the bonding aluminum wire image; and detecting an outer contour feature of the aluminum wires on the grayscale-enhanced image of the bonding aluminum wire image.

In some embodiments, the method of determining a dispensing position further includes: when a matching degree between the detected outer contour feature and a palladium sheet contour feature template is greater than or equal to a first predetermined threshold, using the detected outer contour feature as a contour feature image of a palladium sheet.

In some embodiments, the method of determining a dispensing position further includes: when a matching degree between the detected outer contour feature and a nickel pad contour feature template is greater than or equal to a second predetermined threshold, using the detected outer contour feature as a contour feature image of a nickel pad.

In some embodiments, the method of determining the dispensing position further includes calculating a center of gravity of the contour feature image of the temperature sensing probe and determining, based on the center of gravity, a dispensing position of the temperature sensing probe.

In some embodiments, the method of determining the dispensing position further includes binarizing the temperature sensing probe image to obtain a binarized image of the temperature sensing probe image; detecting an inner contour feature of the temperature sensing probe on the binarized image; and when a matching degree between the detected inner contour feature and a temperature sensing probe contour feature template is greater than or equal to a third predetermined threshold, using the detected inner contour feature as a contour feature image of the temperature sensing probe.

In some embodiments, the method of determining the dispensing position further includes enhancing grayscale of the temperature sensing probe image to obtain a grayscale-enhanced image of the temperature sensing probe image; detecting an outer contour feature of the temperature sensing probe on the grayscale-enhanced image of the temperature sensing probe image; and when a matching degree between the detected outer contour feature and a temperature sensing probe contour feature template is greater than or equal to a fourth predetermined threshold, using the detected outer contour feature as a contour feature image of the temperature sensing probe.

In some embodiments, the method of determining a dispensing position further includes determining, based on the dispensing position and a needle-calibration physical error, an offset value of the dispensing position, where the offset value is sent to a robot that controls a dispensing operation to compensate for the offset position of a dispensing needle when performing the dispensing operation.

In some embodiments, the method of determining a dispensing position further includes setting a calibration point; detecting a circular contour of the calibration point and determining the center of the calibration point from the center of the circular contour; dispensing at the calibration point and detecting a circular contour of the dispensing point to obtain the center of the dispensing point; determining a physical error based on a difference between the center of the calibration point and the center of the dispensing point; and determining the physical error as a needle-calibration physical error when a difference between the position of the robot at the calibration point and the position of the robot at the dispensing point is equal to the physical error.

In a second aspect, the present application provides a dispensing system for batteries, including a robot configured to send a trigger signal for image acquisition upon reaching a predetermined position; a camera configured to receive the trigger signal, acquire, based on the trigger signal, an image of a battery module and send the image to a vision host computer; and the vision host computer configured to perform the method of determining a dispensing position according to embodiments of the present application to acquire, based on the image of the battery module, a dispensing position of at least one object on the battery module and send the dispensing position to the robot, where the robot is further configured to receive the dispensing position and move to the dispensing position to control an adhesive container and a dispensing needle to perform a dispensing operation.

In some embodiments, the dispensing system for batteries further includes a programmable logic controller configured to parse a module code of the battery module and send it to the vision host computer; and record the dispensing in real time.

In some embodiments, the vision host computer is further configured to receive the module code of the battery module from the programmable logic controller; and acquire, based on the module code, addressing trajectory information for at least one object on the battery module, and store the addressing trajectory information on the robot.

In some embodiments, the robot is further configured to move, based on the addressing trajectory, to a photographing point position of an object on the trajectory, trigger the camera to acquire an image of the object at the point position and send the image to the vision host computer; receive from the vision host computer a dispensing position of the object at the point position and its offset value; and based on the received dispensing position of the object at the point position and its offset value, control the adhesive container and the dispensing needle to perform the dispensing operation at the point position.

In some embodiments, the vision host computer is further configured to receive the module code of the battery module from the programmable logic controller; acquire, based on the module code, addressing trajectory information for at least one object on the battery module, and store the addressing trajectory information on the vision host computer; and distribute photographing point positions of all objects on the addressing trajectory to two robots at a time.

In some embodiments, each of the two robots is configured to receive the photographing point position of each object on the addressing trajectory distributed from the vision host computer; sequentially move to each of the received object point positions, trigger the camera to acquire an image of the object at the point position and send the image to the vision host computer; receive from the vision host computer a dispensing position of the object at each point position and its offset value; and based on the received dispensing position of the object at each point position and its offset value, control the adhesive container and the dispensing needle to sequentially perform the dispensing operation for each point position.

In a third aspect, the present application provides an apparatus of determining a dispensing position, including a receiving module configured to receive an image of a battery module; a processing module configured to process the image to obtain a contour feature image of at least one object on the battery module; and a determining module configured to determine, based on the contour feature image, a dispensing position of the at least one object.

In a fourth aspect, the present application provides an electronic device, including a processor, a memory, and a communication bus, where the communication bus is configured to realize connection and communication between the processor and the memory; and the processor is configured to execute one or more programs stored in the memory to implement the method of determining a dispensing position according to the embodiments of the present application.

In a fifth aspect, the present application provides a computer-readable storage medium, the computer-readable storage medium storing one or more programs, the one or more programs being executable by one or more processors to implement the method of determining a dispensing position according to the embodiments of the present application.

BRIEF DESCRIPTION OF DRAWINGS

In order to illustrate the technical solutions of the embodiments of the present application more clearly, the following briefly introduces the drawings required in the embodiments of the present application. Apparently, the drawings described below are only some embodiments of the present application. For those of ordinary skill in the art, other drawings can also be obtained according to the drawings without any creative effort.

FIG. 5 is a schematic flowchart of a dispensing operation in the case of dual-module double robots according to an embodiment of the present application;

FIG. 6 is a schematic flowchart of a method of determining a dispensing position according to an embodiment of the present application;

Figure 1:
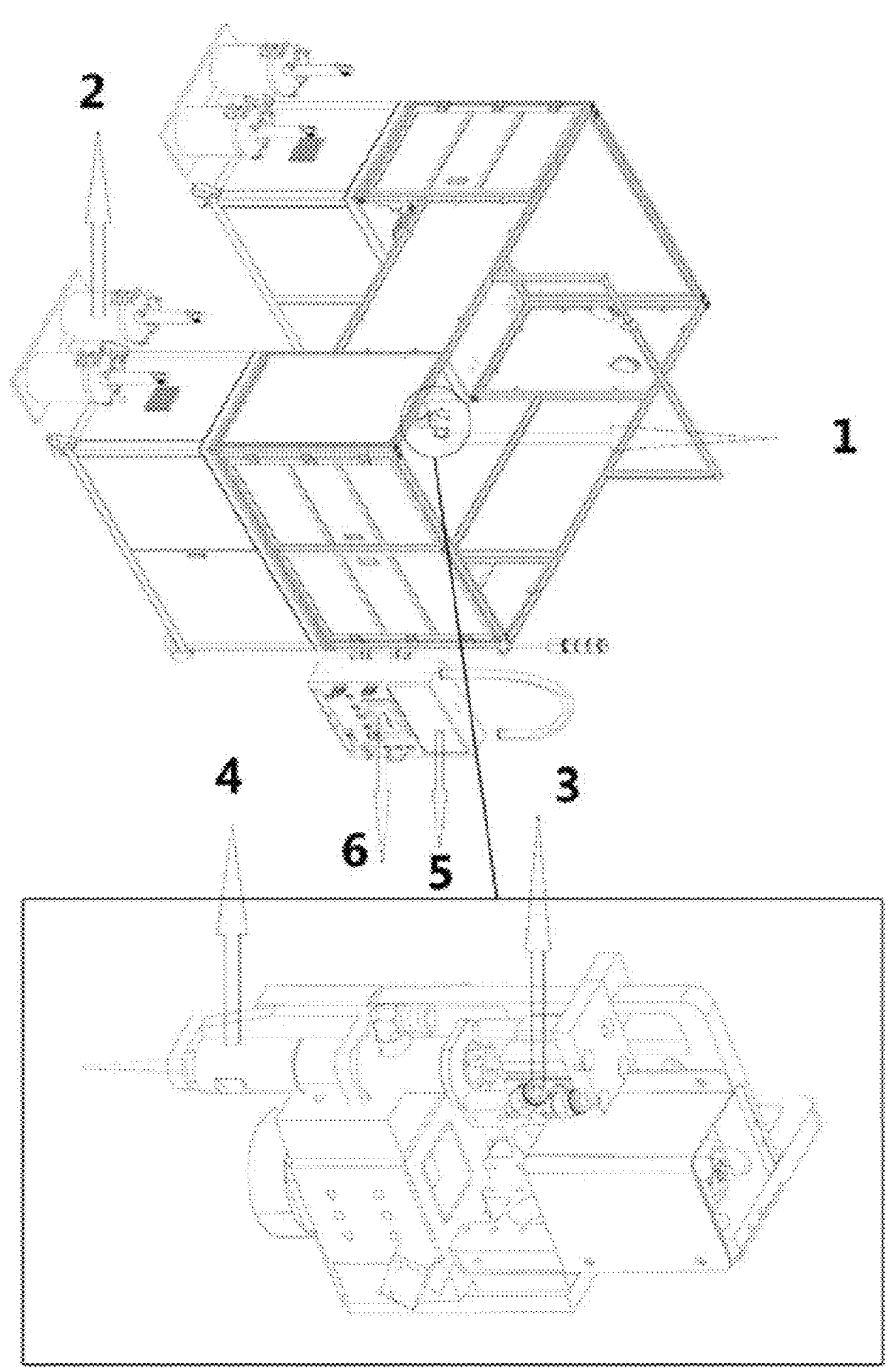
FIG. 1 is a schematic diagram of a production scenario based on a lithium-ion power battery using flexible circuit board bonding and dispensing according to an embodiment of the present application.

The drawings are not drawn to actual scale.

DETAILED DESCRIPTION

The following further describes the implementations of the present application in detail with reference to the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "a plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of the present application. In the description of the present application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. For those of ordinary skill in the art, the specific meanings of the above terms in the present application may be understood according to specific circumstances.

The development of battery technology needs to consider many design factors at the same time, such as production efficiency of batteries. A battery includes a battery cell, and further includes a flexible circuit board and a connector. The connector realizes an electrical connection between the battery cell and the flexible circuit board. The connector is usually welded to the flexible circuit board. In order to reduce the risk of short-circuiting of the positive and negative electrodes, adhesive is usually dispensed at soldering point positions (solder joints) to cover the solder joints. At present, in a battery manufacturing process, a dispensing operation for the solder joints of the flexible circuit board usually refers to a manual dispensing operation, and there are lots of solder joints on the flexible circuit board, which not only causes high labor intensity but also is prone to error, and leads to high production cost and low production efficiency.

In view of this, in order to solve the problem of high production cost and low production efficiency of the dispensing operation, the present application provides a dispensing system for batteries, in which a vision host computer and a robot with a vision camera are used to determine a dispensing position of a battery module by image processing, and then the robot is used to control an adhesive container and a dispensing needle to perform the dispensing operation. In this way, the manual dispensing operation can be replaced, thus improving production efficiency, reducing production cost, and increasing degree of automation.

Figure 2:
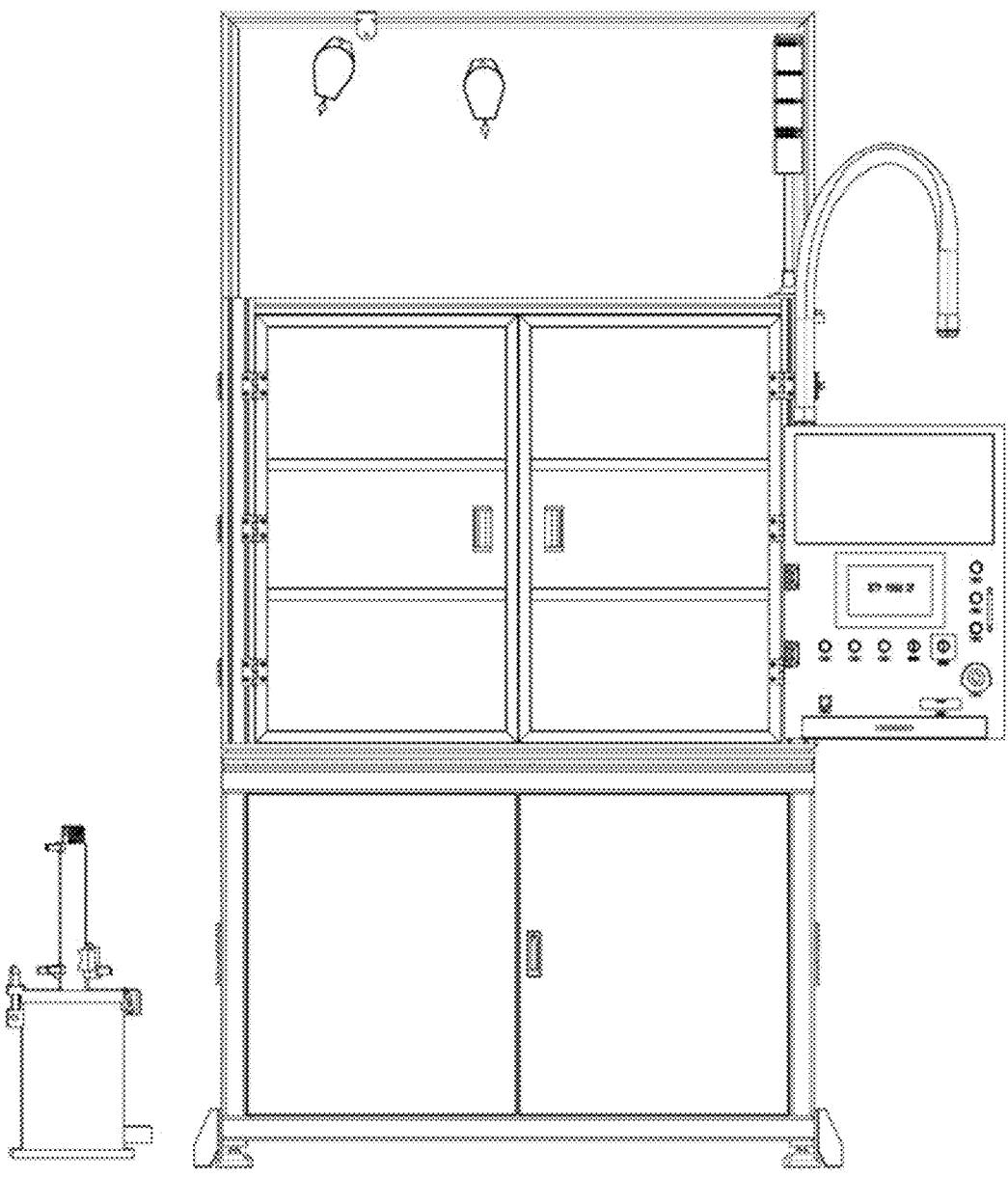
FIG. 2 is a plan top view of FIG. 1.

FIG. 1 illustrates a production scenario based on a lithium-ion power battery using flexible circuit board bonding and dispensing according to some embodiments of the present application. The production scenario is not limited to a single-module assembly line or a dual-module assembly line. As shown in FIG. 1, the hardware consists of two (collaborative) robots 1, two adhesive supply systems (for uninterrupted change of adhesive) 2, two machine vision cameras 3, two dispensing needle valves 4, an industrial control unit (computer) 5, and a SIEMENS KTP900 touch screen 6. FIG. 2 illustrates a plan top view of FIG. 1.

A dispensing system for batteries and a method of determining a dispensing position according to some embodiments of the present application are described in detail below with reference to FIGS. 3 to 10.

Figure 3:
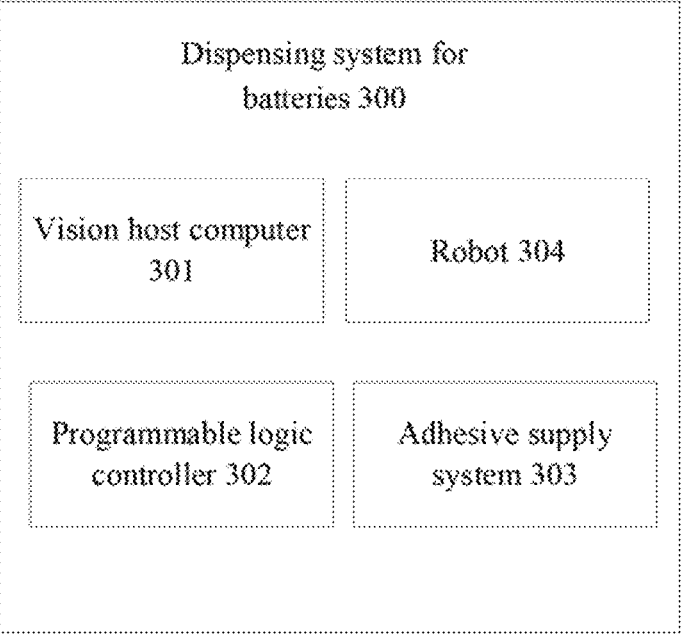
FIG. 3 is a schematic block diagram of a dispensing system for batteries according to an embodiment of the present application.

FIG. 3 illustrates a schematic block diagram of a dispensing system for batteries 300 according to an embodiment of the present application. As shown in FIG. 3, the dispensing system for batteries mainly consists of a vision host computer 301, a programmable logic controller (PLC: Programmable Logic Controller) 302, an adhesive supply system 303, and a robot 304 that controls a dispensing operation. A vision camera (e.g., the vision camera 3 in FIG. 1) used to perform image acquisition of the battery module and a dispensing needle (e.g., the dispensing needle valve 4 in FIG. 1) used to perform the dispensing operation are both arranged on the robot 304.

According to an embodiment of the present application, after a product (i.e., the battery module) arrives at a position, the programmable logic controller 302 reads an information code of the product by means of RFID (Radio Frequency Identification) and parses an operable code, i.e., a module code, of the product from the information code, and then sends the module code to the vision host computer 301. The vision host computer 301 acquires, based on the module code, addressing trajectory information of each object to be dispensed with adhesive on the battery module and stores the addressing trajectory information on the vision host computer 301 or the robot 304.

Figure 4:
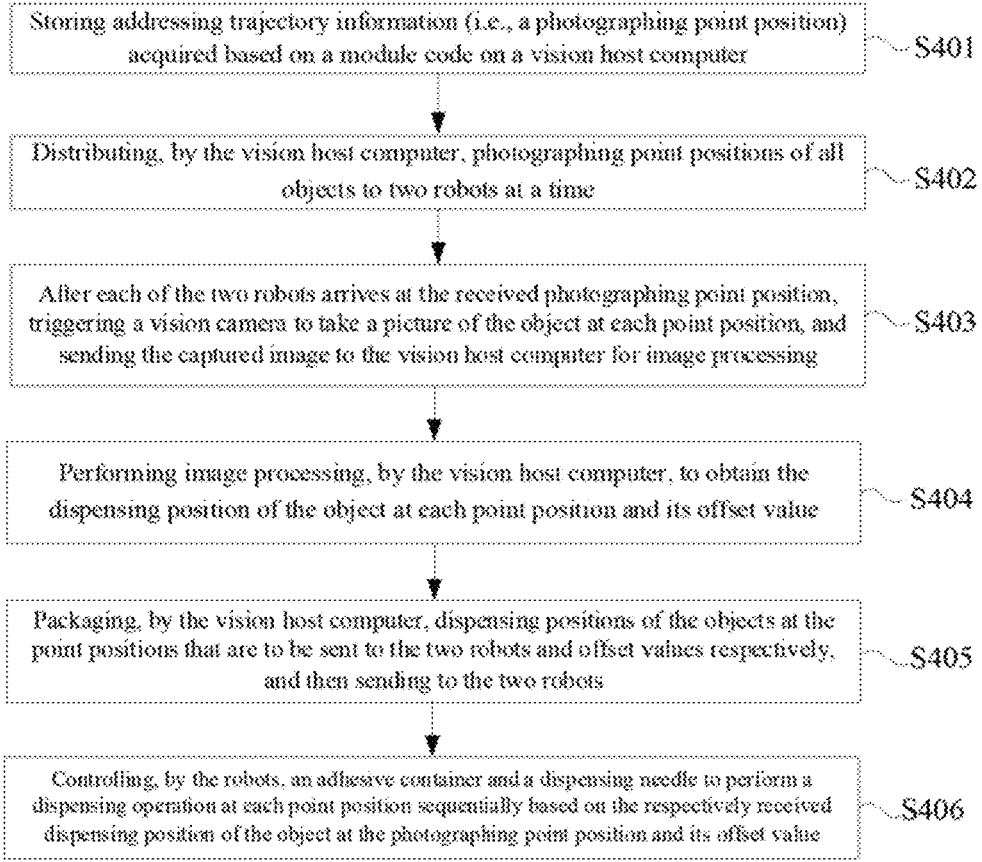
FIG. 4 is a schematic flowchart of a dispensing operation in the case of single-module double robots according to an embodiment of the present application.

FIG. 4 illustrates a schematic flowchart of a dispensing operation in the case of single-module double robots. Specifically, in the case of single-module double robots, addressing trajectory information (also referred to as an assignment point position, a photographing point position, or a photographing position) acquired based on a module code is stored on the vision host computer 301 (step S401); the vision host computer distributes photographing point positions of all the objects to two robots at a time (step S402); after arriving at the received photographing point position respectively, each of the two robots triggers a vision camera to take a picture of the object at each point position and sends the captured image to the vision host computer for image processing (step S403); the vision host computer performs image processing to obtain the dispensing position of the object at each point position and its offset value (step S404); the vision host computer packages the dispensing positions and offset values of the objects at the point positions that are to be sent to the two robots respectively and then sends to the two robots (step S405); and the two robots each control, based on the respectively received dispensing position of the object at the photographing point position and its offset value, an adhesive container and a dispensing needle to perform a dispensing operation at each point position sequentially (step S406).

FIG. 5 illustrates a schematic diagram of a dispensing operation in the case of dual-module double robots. Specifically, in the case of dual-module double robots, addressing trajectory information (i.e., an assignment point position, a photographing point position, or a photographing position) acquired based on the module code is stored on the robot 304 (step S501); and the robot moves, based on the addressing trajectory, to a photographing point position on the trajectory, triggers a vision camera to take a picture of the object at the point position, and sends the captured image to the vision host computer for image processing (step S502); the vision host computer performs image processing to obtain the dispensing position of the object at the point position and its offset value, and then sends the dispensing position of the object at the point position and its offset value to the robot (step S503); and the robot controls, based on the received dispensing position and offset value, the adhesive container and the dispensing needle to perform the dispensing operation of the object at the point position (step S504). Then, the robot moves to the next photographing point position on the addressing trajectory to take a picture, performs image processing and dispensing operation, and repeats the processes until the dispensing of all point positions is completed.

It should be understood that, according to embodiments of the present application, the objects to be dispensed include bonding aluminum wires and the temperature sensing probe, and the bonding aluminum wires include bonding aluminum wires of a palladium sheet and bonding aluminum wires of a nickel pad.

The following is a detailed description of a solution for acquiring the dispensing position and the offset value through image processing performed by the vision host computer.

FIG. 6 illustrates a schematic flowchart of a method of determining a dispensing position according to an embodiment of the present application. It should be understood by those skilled in the art that the method of determining a dispensing position shown in FIG. 6 may be implemented by the vision host computer 301 in FIG. 3.

As shown in FIG. 6, at step S601, an image of the battery module is received.

As described above, the vision host computer 301 can acquire, based on the module code of the battery module, addressing trajectory information (also referred to as an assignment point position, a photographing point position, or a photographing position) of each object to be dispensed with adhesive on the battery module. After knowing the addressing trajectory information of each object to be dispensed on the battery module, the robot may determine, based on the photographing point position, whether the picture taken is of the bonding aluminum wires or of the temperature sensing probe. Thus, according to an embodiment of the present application, the received image of the battery module includes the received bonding aluminum wire image or temperature sensing probe image.

At step S602, the received image is processed to obtain a contour feature image of at least one object on the battery module.

According to an embodiment of the present application, the processing to the received image includes binarization and image enhancement. Each object will be described in detail below.

According to an embodiment of the present application, when the received image of the battery module is a bonding aluminum wire image, step S602 further includes binarizing the bonding aluminum wire image to obtain a binarized image of the bonding aluminum wires, and detecting an outer contour feature of the aluminum wires on the binarized image.

The binarized image is a black-and-white image obtained by image RGB compression of a feature image (e.g., a gray-and-white image), that is, by threshold-based image segmentation of a grayscale map, which facilitates the subsequent recognition and calculation of the image contour feature, where the segmentation threshold has a minimum of 0 and a maximum of 255. The specific threshold can be set according to the specific object. For example, when binarizing an image of the palladium sheet, the minimum threshold can be set to 90 and the maximum threshold to 255; when binarizing an image of the nickel pad, the minimum threshold can be set to 164 and the maximum threshold to 255.

According to another embodiment of the present application, in the case where the received image of the battery module is a bonding aluminum wire image, step S602 further includes performing grayscale enhancement on the bonding aluminum wires to obtain a grayscale-enhanced image of the bonding aluminum wire image, and detecting an outer contour feature of the aluminum wires on the grayscale-enhanced image. The way of performing enhancement on a grayscale image to make its effect closer to the actual environment in the field is a means of image processing as the environment changes.

According to an embodiment of the present application, when a matching degree between the detected outer contour feature and a palladium sheet contour feature template is greater than or equal to a first predetermined threshold, the detected outer contour feature is used as a contour feature image of the palladium sheet.

Figure 7A:
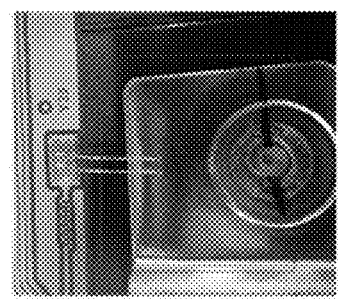
FIGS. 7A to 7H are schematic diagrams showing image processing, contour recognition, dispensing position determination, and dispensing of bonding aluminum wires of a palladium sheet respectively according to an embodiment of the present application.
Figure 7B:
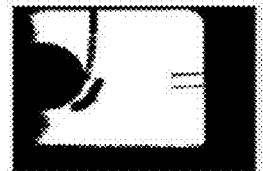
Figure 7C:
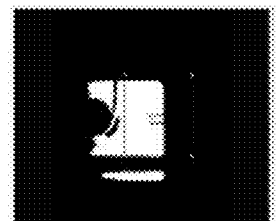

FIGS. 7A to 7B illustrate a real picture and a binarized image of bonding aluminum wires of a palladium sheet, respectively, where the binarized image has a minimum threshold of 255 and a maximum threshold of 255. FIG. 7C illustrates a schematic diagram of matching between the detected outer contour feature and a palladium sheet contour feature template. As shown in FIG. 7C, the box area refers to the palladium sheet contour feature template, and the contour feature template is set on the vision host computer. The threshold (i.e., the minimum fraction parameter of the contour feature template on the vision host computer) is generally set to be 70-85 in the present application, but it should be understood by those skilled in the art that the setting of the threshold is not limited thereto. When a matching degree between the outer contour feature of the aluminum wires on the detected image and the palladium sheet contour feature template is greater than a first preset threshold (e.g., the minimum fraction of 80), the detected outer contour feature is used as a contour feature image of the palladium sheet.

According to an embodiment of the present application, when a matching degree between the detected outer contour feature and a nickel pad contour feature template is greater than or equal to a second predetermined threshold, the detected outer contour feature is used as a contour feature image of the nickel pad.

Figure 8A:
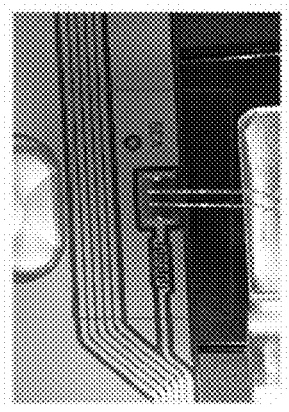
FIGS. 8A to 8H are schematic diagrams showing image processing, contour recognition, dispensing position determination, and dispensing of bonding aluminum wires of a nickel pad respectively according to an embodiment of the present application.
Figure 8B:
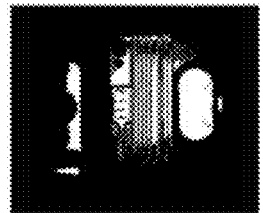
Figure 8C:
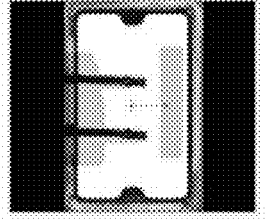
Figure 8D:
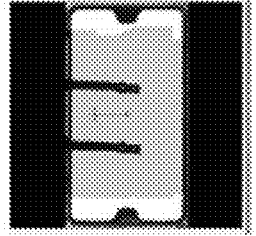

FIGS. 8A to 8B illustrate a real picture and a binarized image of bonding aluminum wires of a nickel pad, respectively, where the binarized image has a minimum threshold of 164 and a maximum threshold of 255. FIGS. 8C and 8D illustrate schematic diagrams of matching between the detected outer contour feature and two different nickel pad contour feature templates, respectively. As shown in FIGS. 8C and 8D, the box areas are the nickel pad contour feature templates set on the vision host computer. The threshold (i.e., the minimum fraction parameter of the contour feature template on the vision host computer) is generally set to be 70-85 in the present application, but it should be understood by those skilled in the art that the setting of the threshold is not limited thereto. When a matching degree between the outer contour feature of the aluminum wires on the detected image and the nickel pad contour feature templates is greater than a second preset threshold (e.g., a minimum fraction of 75), the detected outer contour feature is used as a contour feature image of the nickel pad.

At step S603, a dispensing position of the at least one object is determined based on the contour feature image.

According to an embodiment of the present application, based on that a contour feature image of the bonding aluminum wires of the palladium sheet or the bonding aluminum wires of the nickel pad is determined, step S603 includes detecting endpoints of two aluminum wires parallel to each other on a feature contour feature of the bonding aluminum wires and detecting an edge intersecting the two aluminum wires as a datum line; calculating the distance between the two aluminum wires parallel to each other; and determining a dispensing position of the bonding aluminum wires based on the midpoint of a line used to calculate the distance between the two aluminum wires, the datum line, and a connecting line between the endpoints of the two aluminum wires.

Figure 7D:
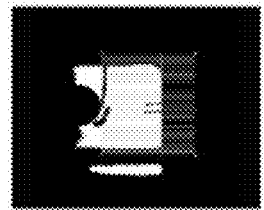
Figure 7E:
Figure 7F:
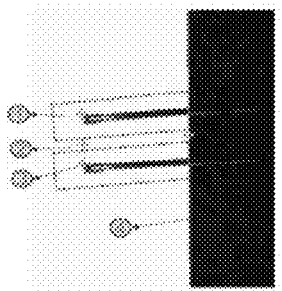
Figure 7G:
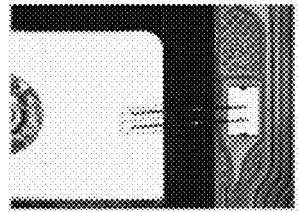
Figure 7H:
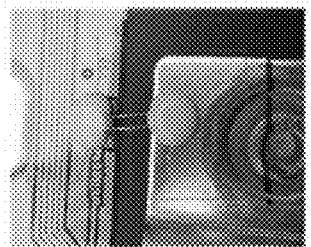

FIGS. 7D and 7E illustrate schematic diagrams of edge detection and aluminum wire endpoint detection of bonding aluminum wires of a palladium sheet, respectively. FIG. 7F illustrates a schematic diagram in which two endpoints 1, 3 of palladium sheet aluminum wires parallel to each other and an edge datum line 4 intersecting the two aluminum wires are detected, where a dispensing position 2 of the bonding aluminum wires is determined based on the midpoint of a straight line used to calculate the distance between the two aluminum wires, the datum line, and a connecting line between the endpoints of the two aluminum wires. FIG. 7G illustrates a grayscale map of endpoint detection and calculation of actual dispensing point position for the palladium sheet in FIG. 7A. FIG. 7H illustrates a diagram of a dispensing effect of palladium sheet aluminum wires, where pins (endpoints) of the aluminum wires are completely covered.

Figure 8E:
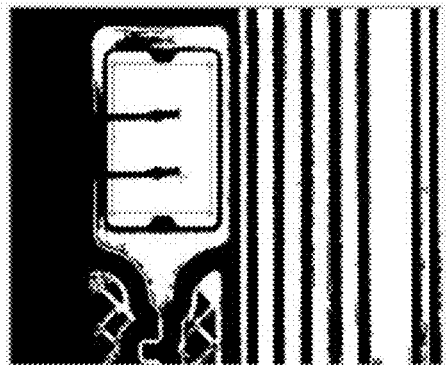
Figure 8F:
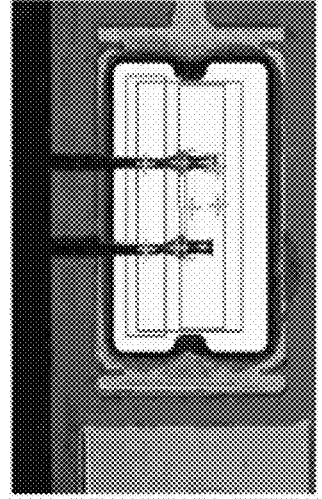
Figure 8G:
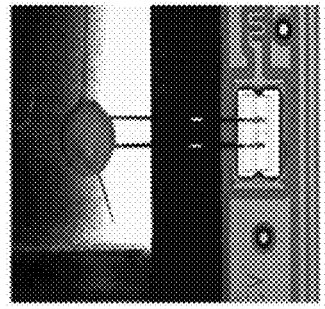
Figure 8H:
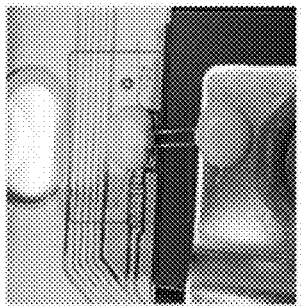

FIG. 8E illustrates a schematic diagram of aluminum wire endpoint detection on bonding aluminum wires of a nickel pad. FIG. 8F illustrates a schematic diagram of detecting two endpoints of nickel pad aluminum wires parallel to each other and an edge datum line intersecting the two aluminum wires, where a dispensing position of the bonding aluminum wires is determined based on the midpoint of a straight line used to calculate the distance between the two aluminum wires, the datum line, and a connecting line between the endpoints of the two aluminum wires. FIG. 8G illustrates a grayscale diagram of endpoint detection and calculation of actual dispensing point position for the palladium sheet in FIG. 8A. FIG. 8H illustrates a diagram of a dispensing effect of palladium sheet aluminum wires, where pins (endpoints) of the aluminum wires are completely covered.

According to an embodiment of the present application, in the case where the received image of the battery module is a temperature sensing probe image, the step S602 further includes binarizing the temperature sensing probe image to obtain a binarized image of the temperature sensing probe image, and detecting an inner contour feature of the temperature sensing probe on the binarized image. According to an embodiment of the present application, when binarizing the temperature sensing probe image, the minimum threshold can be set to 62 and the maximum threshold to 255. The person skilled in the art should understand that the outer contour feature of the temperature sensing probe may also be detected on the binarized image of the temperature sensing probe image, which is similar in principle and will not be repeated herein.

According to another embodiment of the present application, in the case where the received image of the battery module is a temperature sensing probe image, step S602 further includes performing an enhancement processing on grayscale of the temperature sensing probe to obtain a grayscale-enhanced image of the temperature sensing probe image, and detecting an outer contour feature of the temperature sensing probe on the grayscale-enhanced image. The enhancement ratio, gain and compensation value of image enhancement may be set as desired. According to an embodiment of the present invention, the range of the enhancement ratio is generally set to be 80-99, the range of the gain is generally set to be 80-99, and the range of the compensation is generally taken as $\frac{1}{3}$-$\frac{2}{3}$ of the enhancement ratio. The person skilled in the art should understand that the inner contour feature of the temperature sensing probe can also be detected on the grayscale-enhanced image of the temperature sensing probe image, which is similar in principle and will not be repeated herein.

According to an embodiment of the present application, when a matching degree between the detected inner contour feature of the temperature sensing probe and a temperature sensing probe contour feature template is greater than or equal to a third predetermined threshold, the detected inner contour feature of the temperature sensing probe is used as a contour feature image of the temperature sensing probe.

According to an embodiment of the present application, when a matching degree between the detected outer contour feature of the temperature sensing probe and a temperature sensing probe contour feature template is greater than or equal to a fourth predetermined threshold, the detected outer contour feature of the temperature sensing probe is used as a contour feature image of the temperature sensing probe.

Figure 9A:
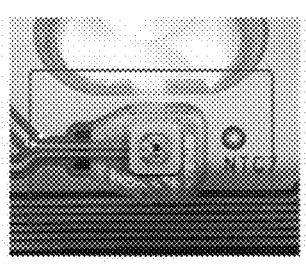
FIGS. 9A to 9J are schematic diagrams showing image processing, contour recognition, and dispensing of a temperature sensing probe according to an embodiment of the present application.
Figure 9B:
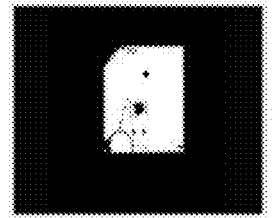
Figure 9C:
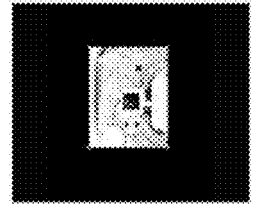
Figure 9D:
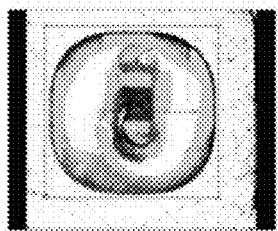
Figure 9E:
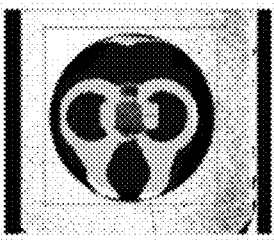
Figure 9F:
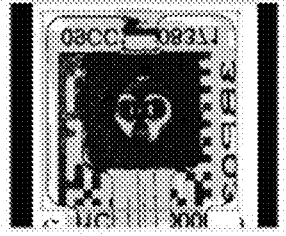
Figure 9G:
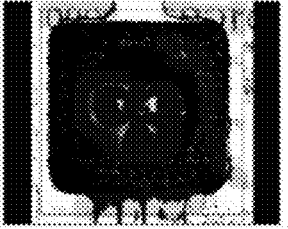

FIGS. 9A to 9C illustrate a real picture of the temperature sensing probe, a binarized image, and a grayscale-enhanced image, respectively, where the binarized image has a minimum threshold of 62 and a maximum threshold of 255, and the grayscale-enhanced image has an enhancement ratio of 99, a gain of 88, and a compensation of 47. FIGS. 9D to 9G illustrate schematic diagrams of matching between the detected contour feature and different contour feature templates of the temperature sensing probe, respectively. FIG. 9D illustrates local processing of the temperature sensing probe to obtain an overall outer circular contour of the temperature sensing probe by image contour enhancement. FIG. 9E illustrates local processing of the temperature sensing probe to obtain an inner circular contour of the binarized image contour processing by image contour binarization. FIG. 9F illustrates recognition of the overall contour of the temperature sensing probe by image contour enhancement. FIG. 9G illustrates recognition of the overall contour of the temperature sensing probe by image binarization.

According to an embodiment of the present application, on the basis that a contour feature image of the temperature sensing probe is determined, step S603 includes calculating a center of gravity of the contour feature image of the temperature sensing probe and determining, based on the center of gravity, a dispensing position of the temperature sensing probe.

Figure 9H:
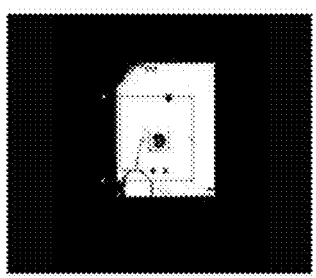
Figure 9I:
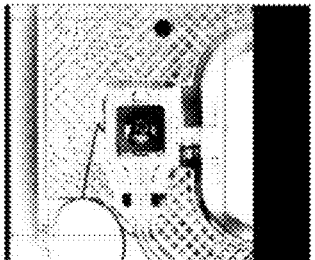
Figure 9J:
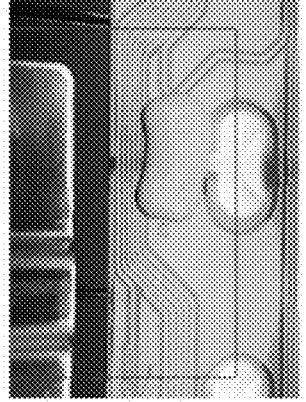

FIGS. 9H and 9I illustrate schematic diagrams of a contour recognition result of the binarized image and a detection effect of the temperature sensing probe in FIG. 9A in the case of the contour recognition result of the enhanced image, respectively. FIG. 9J illustrates a diagram of a dispensing effect of the temperature sensing probe, where the temperature sensing probe is completely covered.

After the dispensing position of the bonding aluminum wires and the temperature sensing probe is obtained through image processing, the robot controls a dispensing system and a dispensing needle to perform a dispensing operation. There may be a deviation between the actual point position of the dispensing needle during the dispensing operation and the acquired dispensing position, so needle calibration is needed before the dispensing operation, that is, after an offset value calculated visually is sent to the robot, the first thing that needs to be addressed is the physical error between structural hardware. Needle calibration only makes sense if the physical error on the hardware is bound and human damage is omitted later.

Figure 10:
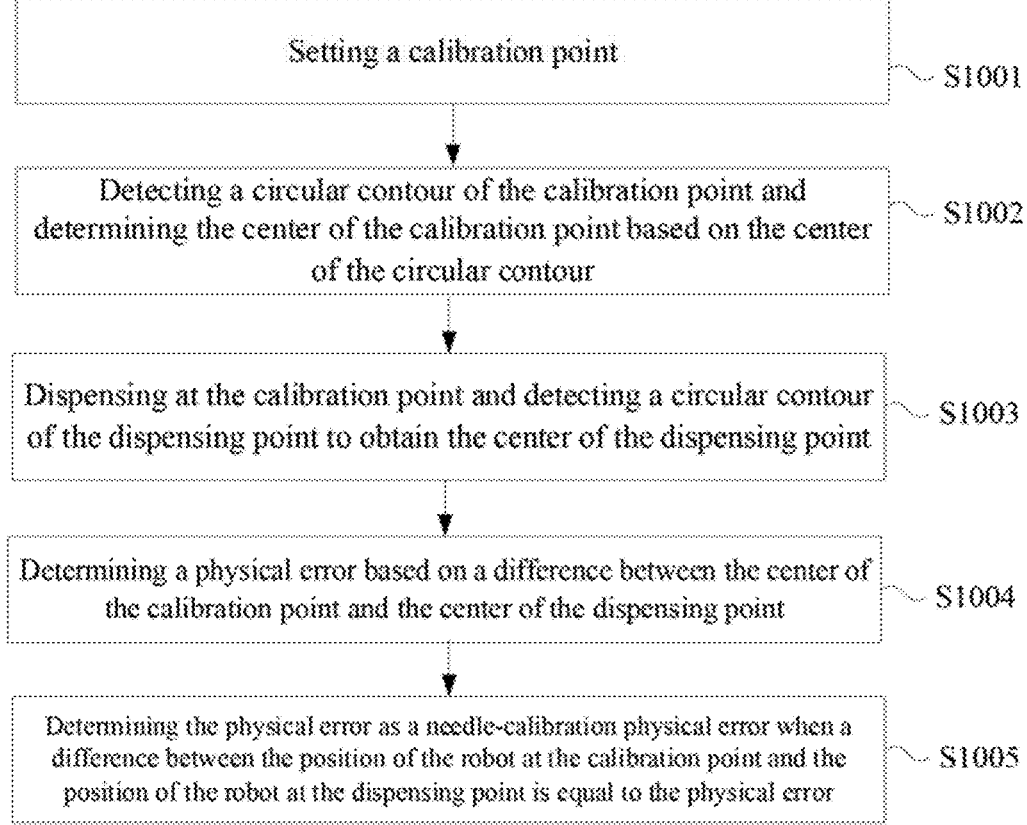
FIG. 10 is a schematic logic flowchart of needle calibration according to an embodiment of the present application.

The logical flow of needle calibration is described according to an exemplary embodiment of the present application. As shown in FIG. 10, at step S1001, a calibration point is set. It should be understood that during needle calibration, it is necessary to first find a point on a calibration block, called the calibration point.

As shown in FIG. 10, at step S1002, a circular contour of the calibration point is detected and the center of the calibration point is determined based on the center of the circular contour. The calibration point is subjected to image processing similar to an algorithm for the temperature sensing probe, that is, detecting the circular contour of the calibration point and determining the center of the calibration point based on the center of the circular contour $P_1(x, y)$. The center of the calibration point $P_1(x, y)$ is visually calculated to be the most desirable target point position.

As shown in FIG. 10, at step S1003, the calibration point is dispensed with adhesive and the circular contour of the dispensing point is detected to obtain the center of a circle of a dispensing point. Specifically, after the center of the calibration point $P_1(x, y)$ is determined, the calibration point is dispensed with adhesive, and the dispensing point is subjected to the same image processing, that is, detecting the circular contour of the dispensing point, and determining the center of the dispensing point from the circular contour of the dispensing point $P_2(x, y)$. It should be understood that the center of the calibration point $P_1(x, y)$ is a target point and the center of the dispensing point $P_2(x, y)$ is an actual point subjected to dispensing.

As shown in FIG. 10, at step S1004, a physical error is determined based on a difference between the center of the calibration point and the center of the dispensing point. The calculated difference between the center of the calibration point $P_1(x, y)$ and the center of the dispensing point $P_2(x, y)$ is a physical error value to be bound. That is, the physical error $\Delta P(X, Y)=P_1(x, y)-P_2(x, y)$. According to a specific embodiment, $\Delta P(X, Y)=\Delta P(Cam\_BiaoDingX3, Cam\_BiaoDingY3)=\Delta P(0.236812, 1.284963)$. The calculated $\Delta P(X, Y)$ will be sent to the robot.

As shown in FIG. 10, at step S1005, the physical error is determined as a needle calibration physical error, when a difference between the position of the robot at the calibration point and the position of the robot at the dispensing point is equal to the physical error.

According to a specific embodiment, Cam_BiaoDingX1 and Cam_BiaoDingX2 and Cam_BiaoDingY1 and Cam_BiaoDing Y2 are the positions of the robot at the calibration point and at the dispensing point, which are displayed at a robot terminal, and $P_1(x, y)$ and $P_2(x, y)$ are displayed at a vision terminal, and no matter at which terminal they are displayed, the deviation value is fixed. That is, if the deviation value of vision calculation is equal to the deviation value of a robot movement, it means that the goal of the vision calculation is the same as the goal of actual implementation of the robot, and the offset value for compensation of needle calibration is correct.

The deviation on the robot terminal is calculated by the following:

$$\Delta P_1(X, Y) =$$
$$P(Cam\_BiaoDingX1, Cam\_BiaoDingY1) - P(Cam\_BiaoDingX2,$$
$$Cam\_BiaoDingY2) = P[(Cam\_BiaoDingX1 - Cam\_BiaoDingX2),$$
$$(Cam\_BiaoDingY1 - Cam\_BiaoDingY2)] =$$
$$P[(-4.849381 + 5.086193), (67.8935379 - 66.6085849)] =$$
$$P(0.236812, 1.284953)$$

It can be seen that $\Delta P(X, Y)=\Delta P_1(X, Y)=P(0.236812, 1.284953)$, so the physical error bound for needle calibration is accurate.

After needle calibration, the needle-calibration physical error is known as long as the needle is not changed. In this case, based on the acquired dispensing position and the needle calibration physical error, it is possible to determine an offset value of the dispensing position; and by sending this offset value to the robot that controls the dispensing operation, it is possible to compensate for the offset position of the dispensing needle during dispensing operation.

Compared with manual dispensing, dispensing by the robot not only improves production efficiency and reduces production cost, but also has a better dispensing effect with a more complete and uniform coverage.

In the present application, the contour feature of the bonding aluminum wires or the temperature sensing probe is recognized visually, and the contour feature image of the bonding aluminum wires or temperature sensing probe is acquired by comparing the contour feature with the feature template, to determine the dispensing position of the bonding aluminum wires and the temperature sensing probe. Moreover, the dispensing needle is calibrated for calculating the needle calibration physical error, so that the offset value of the dispensing position is calculated and the offset value is compensated during dispensing. This makes a dispenser to perform dispensing accurately, ensuring a lean manufacturing process for lithium battery modules.

In the case of single-module double robots, the two robots are staggered, for example, the two robots perform dispensing operations from a certain point to each side to minimize the risk of mutual interference or collision.

Figure 11:
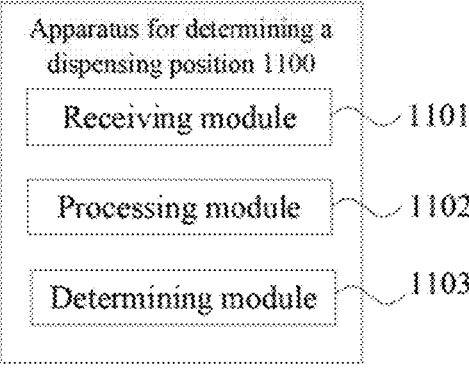
FIG. 11 is a schematic block diagram of an apparatus of determining a dispensing position according to an embodiment of the present application.

FIG. 11 illustrates a block diagram of an apparatus of determining a dispensing position 1100 according to an exemplary embodiment of the present application.

As shown in FIG. 11, the apparatus of determining a dispensing position 1100 includes a receiving module 1101 configured to receive an image of a battery module.

As shown in FIG. 11, the apparatus of determining a dispensing position 1100 further includes a processing module 1102 configured to process the image to obtain a contour feature image of at least one object on the battery module.

As shown in FIG. 11, the apparatus of determining a dispensing position 1100 further includes a determining module 1103 configured to determine, based on the contour feature image, a dispensing position of the at least one object.

The apparatus of determining a dispensing position according to an embodiment of the present application can implement the method of determining a dispensing point according to the above embodiments, which has the similar implementation principle and technical effect and will not be repeated herein.

The apparatus of determining a dispensing position disclosed in the present application may be applied to various scenarios including but not limited to dispensing of flexible circuit boards for battery modules to improve the dispensing efficiency and effectiveness, ensuring the lean manufacturing process of lithium battery modules.

Figure 12:
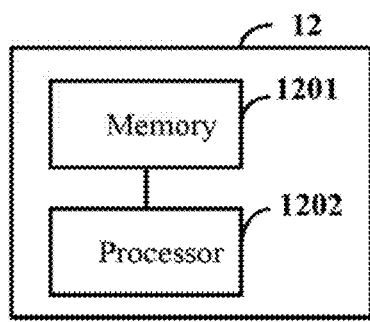
FIG. 12 is a schematic block diagram of an electronic device capable of implementing the method of embodiments of the present application, according to an embodiment of the present application.

Some embodiments of the present application further provide an electronic device. FIG. 12 illustrates a block diagram of an electronic device 12 according to some embodiments of the present disclosure. The electronic device may be used to implement the method according to any embodiment of the present disclosure.

For example, in some embodiments, the electronic device 12 may be a variety of types of devices, which may include, for example, but are not limited to, a mobile terminal such as a mobile phone, a laptop computer, a digital broadcast receiver, a PDA (personal digital assistant), a PAD (tablet computer), a PMP (portable multimedia player), and an in-vehicle terminal (e.g., a vehicle navigation terminal), as well as a fixed terminal such as a digital TV, and a desktop computer. For example, the electronic device 12 may include a display panel for displaying data and/or execution results utilized in the solution of the present disclosure. For example, the display panel may be of various shapes, such as a rectangular panel, an oval panel, or a polygonal panel. Further, the display panel may be not only a flat panel, but also a curved panel or even a spherical panel.

As shown in FIG. 12, the electronic device 12 of this embodiment includes a memory 1201 and a processor 1202 coupled to the memory 1201. It should be noted that components of the electronic device 12 shown in FIG. 12 are exemplary and not limiting, and the electronic device 12 may have other components as needed for practical applications. The processor 1202 may control other components of the electronic device 12 to perform desired functions.

In some embodiments, the memory 1201 is configured to store one or more computer-readable instructions. The processor 1202 is configured to implement the method according to any of the above embodiments when the computer-readable instructions are run by the processor 1202. Specific implementations of various steps of the method and related description content can refer to the embodiments described above, which will not be repeated herein.

For example, the processor 1202 and the memory 1201 may directly or indirectly communicate with each other. For example, the processor 1202 and the memory 1201 may communicate via a network. The network may include a wireless network, a wired network, and/or any combination of a wireless network and a wired network. The processor 1202 and the memory 1201 may also communicate with each other via a system bus, and the present disclosure is not limited thereto.

For example, the processor 1202 may be embodied as a variety of suitable processors, processing devices, and the like, for example, a central processing unit (CPU), a graphics processing unit (GPU), and a network processor (NP); it may also be a digital signal processor (DSP), an application-specific integrated circuit (ASIC), a field programmable gate array (FPGA) or other programmable logic devices, discrete gates or transistor logic devices, and discrete hardware components. The central processing element (CPU) may be of an X86 or ARM architecture, etc. For example, the memory 1201 may include any combination of various forms of computer-readable storage media, such as a volatile memory and/or a non-volatile memory. The memory 1201 may, for example, include a system memory. The system memory stores, for example, an operating system, an application program, a boot loader (Boot Loader), a database, and other programs. Various applications and various data, etc. may also be stored in the memory media.

Figure 13:
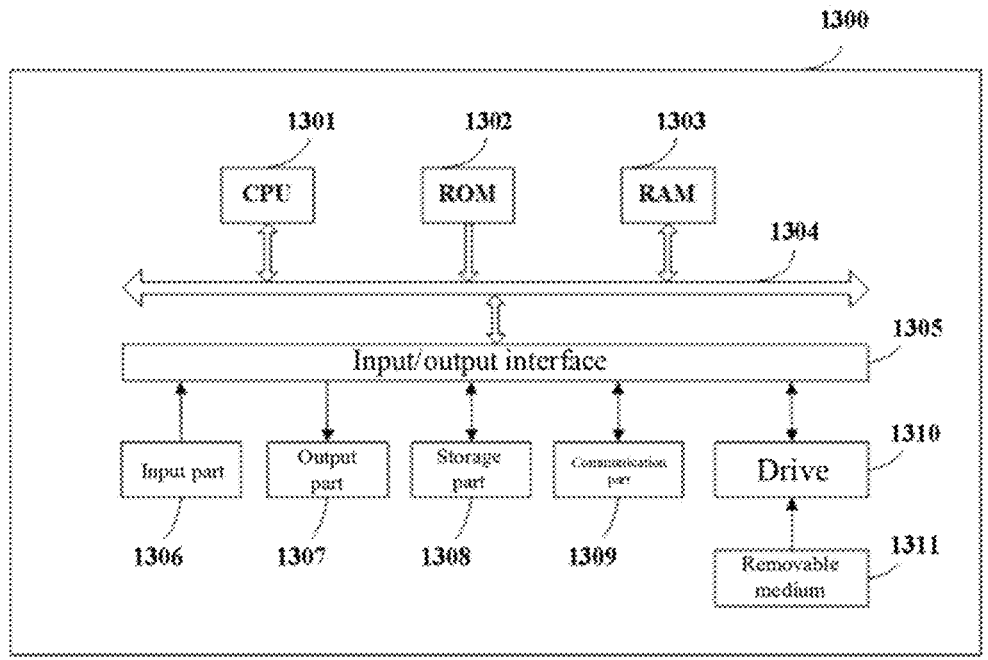
FIG. 13 is a block diagram of an example structure of a computer system that may be employed in an embodiment of the present application.

In addition, according to some embodiments of the present disclosure, when various operations/processes according to the present disclosure are implemented by software and/or firmware, programs that constitute the software may be installed from a storage medium or network to a computer system having a dedicated hardware structure, such as a computer system 1300 shown in FIG. 13. When a variety of programs are installed, this computer system is capable of performing various functions including functions such as those previously described. FIG. 13 illustrates a block diagram of an example structure of a computer system that may be employed in an embodiment of the present disclosure.

In FIG. 13, a central processing unit (CPU) 1301 performs various processes according to a program stored in a read-only memory (ROM) 1302 or a program loaded from a storage part 1308 into a random access memory (RAM) 1303. In the RAM 1303, data required when the CPU 1301 performs various processes and the like is also stored as needed. The central processing unit is merely exemplary, and it may also be other types of processors, such as the various processors described previously. The ROM 1302, the RAM 1303, and the storage part 1308 may be various forms of computer-readable storage media, as described below. It should be noted that although the ROM 1302, the RAM 1303, and the storage part 1308 are shown separately in FIG. 13, one or more of them may be combined or located in the same or different memory or storage modules.

The CPU 1301, the ROM 1302, and the RAM 1303 are connected to each other via a bus 1304. An input/output (I/O) interface 1305 is also connected to the bus 1304.

The following components are connected to the input/output interface 1305: an input part 1306, such as a touch screen, a touch pad, a keyboard, a mouse, an image sensor, a microphone, an accelerometer, a gyroscope; an output part 1307, including a display, such as a cathode ray tube (CRT), a liquid-crystal display (LCD), a loudspeaker, and a vibrator; the storage part 1308, including a hard disk, a magnetic tape, etc.; and a communication part 1309, including a network interface card such as a LAN card, a modem, and the like. The communication part 1309 allows for communication processing performed via a network such as the Internet. It is readily appreciated that while the individual devices or modules in the computer system 1300 illustrated in FIG. 13 communicate via the bus 1304, they may also communicate by a network or other means, where the network may include a wireless network, a wired network, and/or any combination of a wireless network and a wired network.

As desired, a drive 1310 is also connected to the input/output interface 1305. A removable medium 1311 such as a disk, a CD-ROM, a magneto-optical disk, and a semiconductor memory are installed on the drive 1310 as needed, such that computer programs read therefrom are installed in the storage part 1308 as needed.

In the case where the series of processing described above is realized through software, the program that constitutes the software may be installed from a network such as the Internet or a storage medium such as the removable medium 1311.

According to an embodiment of the present disclosure, the process described above with reference to the flowchart may be implemented as a computer software program. For example, embodiments of the present disclosure include a computer program product which includes a computer program loaded on a computer readable medium. The computer program includes a program code for performing the method shown in the flowchart. In such embodiments, the computer program may be downloaded and installed from a network via the communication part 1309, or from the storage part 1308, or from the ROM 1302. When this computer program is executed by the CPU 1301, the above-described functions defined in the method of the embodiments of the present disclosure are performed.

It should be noted that in the context of the present disclosure, a computer-readable medium may be a tangible medium that may include or store a program for use by an instruction execution system, apparatus, or device or in connection with the instruction execution system, apparatus, or device. The computer-readable medium may be a computer-readable signal medium or a computer-readable storage medium or any combination thereof. The computer-readable storage medium may be, for example, but is not limited to, a system, device, or apparatus or component that is electrical, magnetic, optical, electromagnetic, infrared, or semiconducting, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), a fiber optic, a portable compact disk read-only memory (CD-ROM), an optical storage device, a magnetic memory device, or any suitable combination of the foregoing. In the context of the present disclosure, the computer-readable storage medium may be any tangible medium that contains or stores a program that may be used by or in combination with an instruction execution system, apparatus, or device. Moreover, in the context of the present disclosure, the computer-readable signal medium may include a data signal propagated in a baseband or as part of a carrier, the data signal carrying a computer-readable program code. Such propagated data signal may have a variety of forms, including, but not limited to, an electromagnetic signal, an optical signal, or any suitable combination of the foregoing. The computer-readable signal medium may also be any computer-readable medium other than the computer-readable storage medium that sends, propagates, or transmits a program for use by, or in combination with, an instruction executing system, apparatus, or device. The program code contained on the computer-readable medium may be transmitted using any suitable medium including, but not limited to, an electric wire, a fiber optic cable, RF (radio frequency), etc., or any suitable combination of the foregoing.

The computer-readable medium described above may be contained in the electronic device described above; or it may stand alone and not be assembled into that electronic device.

In some embodiments, further provided is a computer program including instructions, where the instructions when executed by a processor cause the processor to perform the method of any of the above embodiments. For example, the instructions may be embodied as computer program codes.

In embodiments of the present disclosure, the computer program codes for performing the operations of the present disclosure may be written in one or more programming languages or combinations thereof. The programming languages include, but are not limited to, object-oriented programming languages such as Java, Smalltalk, C++, and further include conventional procedural programming languages such as the "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of codes, the module, program segment, or part of codes including one or a plurality of executable instructions for implementing specified logical functions. It should also be noted that in some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or operations, or using a combination of special hardware and computer instructions.

The modules, components or units described in the embodiments of the present disclosure may be implemented by software or may be implemented by hardware. Names of the modules, components or units do not constitute limitations on the modules, components or units themselves in a particular case.

The functions described herein above may be performed, at least in part, by one or a plurality of hardware logic components. For example, without limitation, example hardware logic components that may be used include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A computer-implemented method of determining a dispensing position suitable for being dispensed with adhesive based on an image of a battery module comprising:
   receiving the image of the battery module;
   processing the image to obtain a contour feature image of at least one object on the battery module; and
   determining, based on the contour feature image, a dispensing position of the at least one object;
   wherein the method further comprises:
   acquiring based on a module code of the battery module, photographic point position of the at least one object;
   acquiring, based on the photographic point position, a bonding aluminum wire image or a temperature sensing probe image;
   wherein the method further comprises:
   detecting endpoints of two aluminum wires parallel to each other on a contour feature image of the bonding aluminum wires and detecting an edge intersecting the two aluminum wires as a datum line;
   calculating the distance between the two aluminum wires parallel to each other; and
   determining a dispensing position of the bonding aluminum wires based on:
      the midpoint of a straight line used to calculate the distance between the two aluminum wires
      the datum line, and
      a connecting line between the endpoints of the two aluminum wires.

2. The method of determining a dispensing position of claim 1, further comprising:
   determining an offset value of the dispensing position based on the dispensing position and a needle-calibration physical error,
   wherein the offset value is sent to a robot that controls a dispensing operation to compensate for the offset position of a dispensing needle when performing the dispensing operation.

3. The method of determining a dispensing position of claim 1, further comprising:
   setting a calibration point;
   detecting a circular contour of the calibration point and determining, based on the center of the circular contour, the center of the calibration point;
   dispensing at the calibration point and detecting a circular contour of the dispensing point to obtain the center of the dispensing point;

determining a physical error based on a difference between the center of the calibration point and the center of the dispensing point; and
   determining the physical error as a needle-calibration physical error when a difference between the position of the robot at the calibration point and the position of the robot at the dispensing point is equal to the physical error.

4. A dispensing system for batteries, comprising:
   a robot, configured to send a trigger signal for image acquisition upon reaching a predetermined position;
   a camera, configured to receive the trigger signal, acquire, based on the trigger signal, an image of a battery module and send the image to a vision host computer; and
   the vision host computer, configured to perform a method of determining a dispensing position to acquire, based on the image of the battery module, a dispensing position of at least one object on the battery module and send the dispensing position to the robot,
   wherein the robot is further configured to receive the dispensing position and move to the dispensing position to control an adhesive container and a dispensing needle to perform a dispensing operation;
   wherein the method of determining the dispensing position comprises:
   receiving the image of the battery module;
   processing the image to obtain a contour feature image of at least one object on the battery module;
   determining, based on the contour feature image, the dispensing position of the at least one object;
   acquiring, based on a module code of the battery module, photographic point position of the at least one object;
   acquiring based on the photographic point position, a bonding aluminum wire image or a temperature sensing probe image;
   detecting endpoints of two aluminum wires parallel to each other on a contour feature image of the bonding aluminum wires and detecting an edge intersecting the two aluminum wires as a datum line:
   calculating the distance between the two aluminum wires parallel to each other, and
   determining a dispensing position of the bonding aluminum wires based on:
      the midpoint of a straight line used to calculate the distance between the two aluminum wires
      the datum line, and
      a connecting line between the endpoints of the two aluminum wires.

5. The dispensing system for batteries of claim 4, further comprising:
   a programmable logic controller configured to:
      parse a module code of the battery module and send it to the vision host computer; and
      record the dispensing in real time.

6. The dispensing system for batteries of claim 5, wherein the vision host computer is further configured to:
   receive the module code of the battery module from the programmable logic controller; and
   acquire, based on the module code, photographic point position for at least one object on the battery module, and store the photographic point position on the robot.

7. The dispensing system for batteries of claim 6, wherein the robot is further configured to:
   move, based on the photographic point position to a photographing point position of an object on the trajectory, trigger the camera to acquire an image of the object at the point position and send the image to the vision host computer;

receive from the vision host computer a dispensing position of the object at the point position and its offset value; and based on the received dispensing position of the object at the point position and its offset value, control the adhesive container and the dispensing needle to perform a dispensing operation at the point position.

8. The dispensing system for batteries of claim 5, wherein the vision host computer is further configured to:

receive the module code of the battery module from the programmable logic controller;

acquire, based on the module code, photographic point position for at least one object on the battery module, and store the photographic point position on the vision host computer; and distribute photographing point positions of all objects on-the-addressing-trajectory-to two robots at a time.

9. The dispensing system for batteries of claim 8, wherein each of the two robots is configured to:

receive the photographing point position of each object distributed from the vision host computer;

sequentially move to each of the received object point positions, trigger the camera to acquire an image of the object at the point position and send the image to the vision host computer;

receive from the vision host computer a dispensing position of the object at each point position and its offset value; and based on the received dispensing position of the object at each point position and its offset value, control the adhesive container and the dispensing needle to sequentially perform a dispensing operation for each point position.

10. An apparatus of determining a dispensing position, the position suitable for being dispensed with adhesive based on an image of a battery module, comprising:

a receiving module configured to receive an image of a battery module;

a processing module configured to process the image to obtain a contour feature image of at least one object on the battery module; and a determining module configured to determine, based on the contour feature image, a dispensing position of at least one object by carrying out the method of claim 1.

11. An electronic device, comprising a memory, and a communication bus, wherein the communication bus is configured to realize connection and communication between the processor and the memory; and the processor is configured to execute a program stored in the memory to implement the method of determining a dispensing position of claim 1.

12. A non-transitory computer-readable storage medium storing a program, the program being executable by one or more processors to implement the method of determining a dispensing position of claim 1.

* * * * *